United States Patent
Sacristan et al.

(10) Patent No.: US 6,185,937 B1
(45) Date of Patent: Feb. 13, 2001

(54) MASTER CYLINDER WITH HYDRAULIC REACTION INDEPENDENT OF VISCOSITY

(75) Inventors: Fernando Sacristan; Juan Simon Bacardit, both of Drancy (FR)

(73) Assignee: Bosch Sistemas de Frenado S.L, Barcelona (ES)

(*) Notice: Under 35 U.S.C. 154(b), the term of this patent shall be extended for 0 days.

(21) Appl. No.: 09/319,217
(22) PCT Filed: May 10, 1999
(86) PCT No.: PCT/FR99/01109
   § 371 Date: Jun. 1, 1999
   § 102(e) Date: Jun. 1, 1999
(87) PCT Pub. No.: WO99/58383
   PCT Pub. Date: Nov. 18, 1999

(30) Foreign Application Priority Data

May 14, 1998 (FR) .................................................. 98 06064

(51) Int. Cl.[7] ....................................................... B60T 13/20
(52) U.S. Cl. .................. 60/553; 60/591; 91/422
(58) Field of Search .................................. 60/533, 547.1, 60/575, 576, 579, 591, 553; 91/422

(56) References Cited

U.S. PATENT DOCUMENTS

| | | | | |
|---|---|---|---|---|
| 2,343,901 | * | 3/1944 | Groves | 60/575 |
| 4,330,995 | * | 5/1982 | Miyakawa et al. | 60/562 |
| 4,884,492 | * | 12/1989 | Maehara | 91/370 |
| 5,735,124 | * | 4/1998 | Cords et al. | 60/548 |

* cited by examiner

Primary Examiner—John E. Ryznic
(74) Attorney, Agent, or Firm—Lee H McCormick Jr.; Warren Comstock

(57) ABSTRACT

A master cylinder with hydraulic reaction. The master cylinder having a housing with a working chamber (12) therein in which slides a hollow main piston (3). The main piston (3) has a bore (130) for retaining a reaction piston (14) to define a reaction chamber (15). The reaction chamber (15) is connected to the working chamber (12) through a non-return valve (22) and a restriction (17). The non-return valve (22) and restriction (17) are mounted to independently move with respect to the main piston (3) to avoid a defect with a rise in pressure in the reaction chamber (15) when brake fluid retained in the working chamber has an excessively high viscosity.

4 Claims, 2 Drawing Sheets

MASTER CYLINDER WITH HYDRAULIC REACTION INDEPENDENT OF VISCOSITY

The present invention relates to a master cylinder with hydraulic reaction, comprising a working chamber which is filled with a brake fluid and in which there slides, along a first axis, a main piston pierced with an axial bore closed by a reaction piston, the reaction piston also being able to move along the first axis and, within the bore, deliminating a reaction chamber which communicates with the working chamber via a non-return valve and via at least one restriction which together are intended to impose upon a flow of fluid from the working chamber towards the reaction chamber and upon a flow in the opposite direction, first and second respective pressure drops, the first of which is higher than the second.

BACKGROUND OF THE INVENTION

A master cylinder of this type is built into the brake device described in the prior art by EP Patent 0,662,894.

Such a brake device has the advantage that it optimizes the intensity of the braking force in the event of sudden braking, particularly by delaying the rise in the reaction force in reponse to this braking force.

One difficulty has, however, arisen in the optimization of this device in the field of low temperatures, as the viscosity of the brake fluid is then too high to allow a reaction force to occur.

The present invention falls within this context and its object is to provide a master cylinder with hydraulic reaction, the operation of which is not disturbed by variations in the viscosity of the brake fluid, at least in the range of temperatures that a brake device has to cover.

SUMMARY OF THE INVENTION

To this end, the master cylinder of the present invention, which in other respects is in accordance with the generic description given in the above preamble, is essentially characterized in that the non-return valve and the restriction are mounted so that they can move with respect to the main piston.

For example, the non-return valve and the restriction are borne by a third piston sliding in leaktight fashion in the bore between two stops of this bore.

In this case, a spring loaded in compression is preferably placed in the reaction chamber between the reaction piston and the third piston.

According to one possible embodiment of the invention, in which the non-return valve comprises a shut-off member elastically urged against a seat, the restriction simply consists of a leakage between the shut-off member and the seat.

Other features and advantages of the invention will emerge clearly from the description thereof given hereafter with no implied limitation, with reference to the appended drawings:

DETAILED DESCRIPTION OF THE INVENTION

Figure 1:
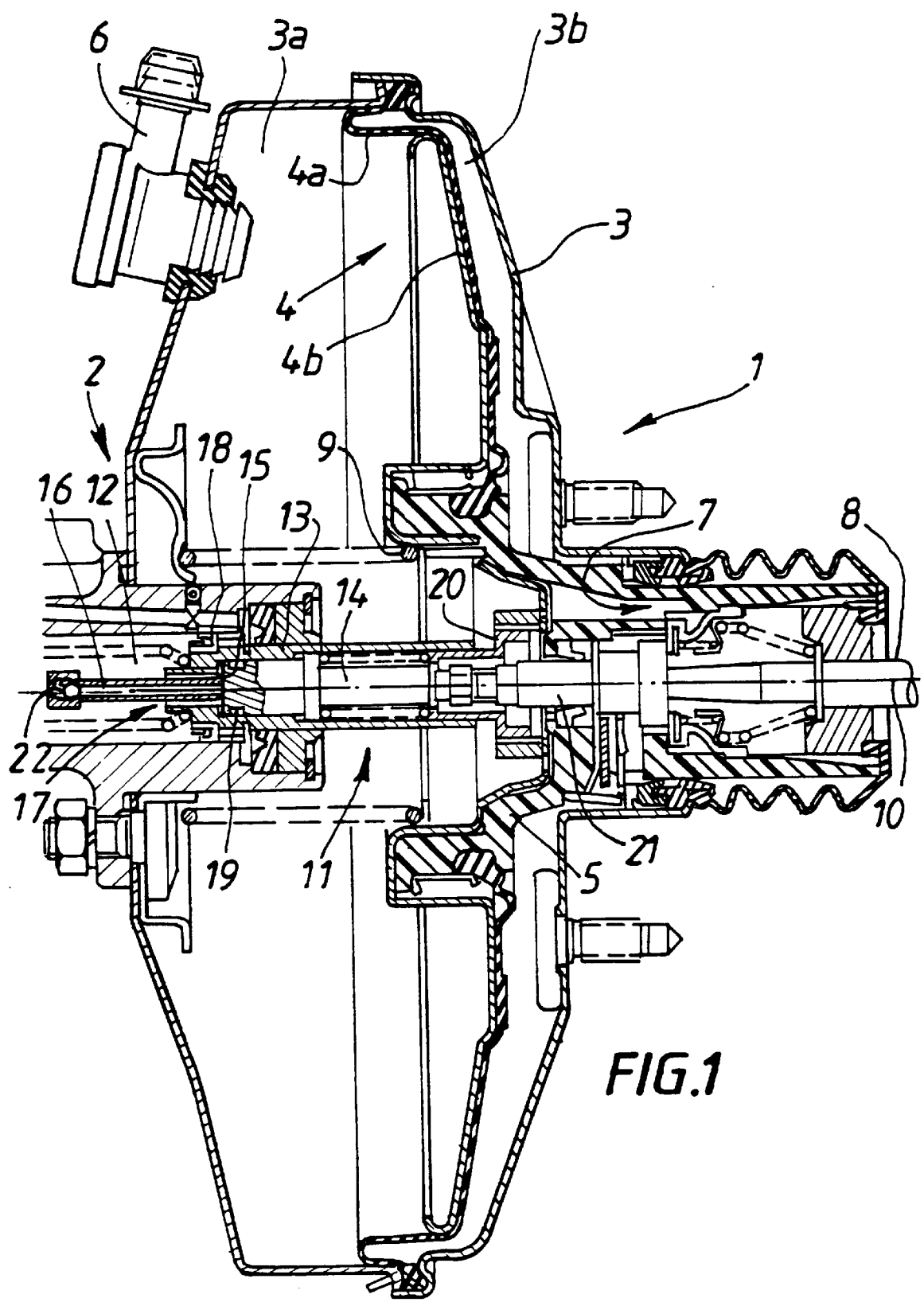
FIG. 1 is a sectional view through the known brake device described in the aforementioned EP Patent 0,662,894.

The patent of the prior art, EP-0,662,894, describes a brake system which roughly comprises a pneumatic booster 1 and a master cylinder 2.

The booster itself comprises a rigid casing 3 split into two chambers 3a and 3b in a leaktight fashion by a moving partition 4 comprising a diaphragm 4a and rigid skirt 4b and capable of driving a pneumatic piston 5 which can move inside the casing 3.

The front chamber 3a, the front face of which is closed in sealed fashion by the master cylinder 2, is permanently connected to a source of vacuum, (not depicted) via a connection 6.

The pressure in the rear chamber 3b is controlled by a valve 7, operated by an operating rod 8, which is connected to a brake pedal, (not depicted.)

When the operating rod 8 is in the position of rest, in this case pulled to the right, the valve 7 establishes communication between the two chambers 3a and 3b of the booster.

As the rear chamber 3b is then subject to the same partial vacuum as the front chamber 3a, the piston 5 is pushed back to the right, into the position of rest, via a spring 9.

Actuating the operating rod 8 towards the left has the effect, first of all, of shifting the valve 7 so that it isolates the chambers 3a and 3b from one another and then of shifting this valve in such a way that it opens the rear chamber 3b to atmospheric pressure.

The difference in pressure between the two chambers, then experienced by the diaphragm 4a, exerts on the moving partition 4 a thrust which tends to shift it to the left and allow it to drive the piston 5 which in turn shifts, compressing the spring 9.

The braking force exerted on the operating rod 8, or "input force" and the brake-boosting force, or "boosting force" which results from the thrust exerted by the moving partition 4, are then applied together along the axis 10 of the push rod 8 in the direction of the master cylinder 2 and combine to form the force with which the latter is actuated.

More specifically, the actuating force is applied to the entire piston 11 of the master cylinder, and causes it to shift to the left (in FIG. 1) along the axis 10, and this leads to a rise in pressure of the brake fluid present in the working chamber 12 of the master cylinder, and to actuation of the brake connected to this chamber.

The piston assembly 11 is in fact composite and comprises a main piston 13 pierced with an axial bore 130 closed in a sealed fashion by a reaction piston 14 and an annular seal 19.

Figure 2:
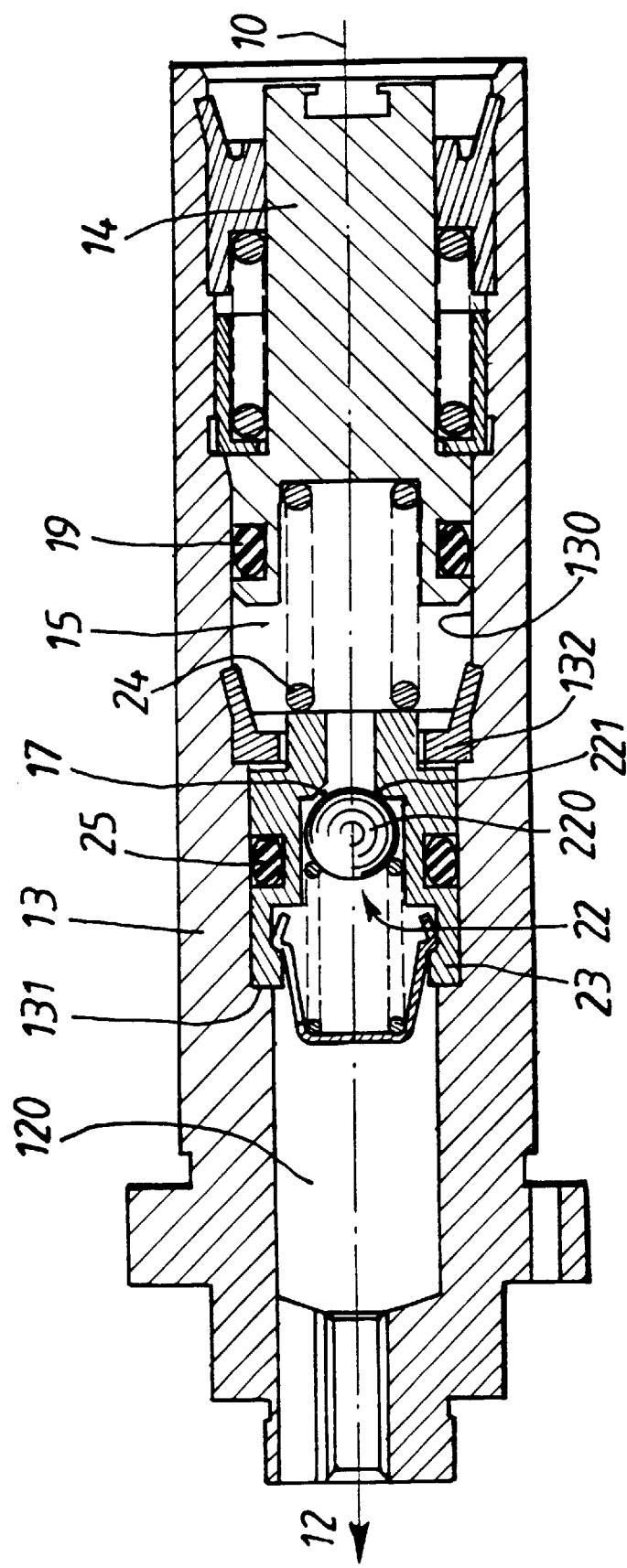
FIG. 2 is a sectional view through specific parts of the master cylinder of the invention.

The reaction piston 14 is mounted so that it can slide, along the axis 10, in the bore 130 and within this bore delimits a reaction chamber 15 which communicates with the working chamber 12 via a non-return valve 22, via at least one restriction 17, and possibly, in the embodiment illustrated in FIG. 2, via a passage 120 formed by a front part of the bore 130.

As described in EP Patent 0,662,894, the non-return valve 22 and the restriction 17 are together intended to impose upon a flow of fluid from the working chamber 12 towards the reaction chamber 15, and upon a flow in the opposite direction, first and second respective pressure drops, the first of which is higher than the second.

Apart from the route for fluid allowed by the valve 22 and the restriction or restrictions 17 between the working chamber 12 of the master cylinder 2 and the reaction chamber 15, the main piston 13 slides in leak tight fashion in the master cylinder 2, sealing being achieved by means of at least one annular seal 18 (FIG. 1).

The main piston 13 is connected, via the ring 20, to the rigid skirt 4b so that it can receive at least some of the boosting force exerted via this skirt.

The reaction piston 14, for its part, is arranged axially facing a push rod 21 capable of transmitting to it at least the input force exerted on the operating rod 8.

As FIG. 2 shows, the non-return valve 22 and the restriction 17 can move with respect to the main piston 13, and are, for example, borne by a third piston 23 mounted so that it can slide in the bore 130, between two axial stops 131, 132 of this bore 130, this piston 23 sliding in leaktight fashion by virtue of an annular seal 25.

In this case, a spring 24 which is loaded in compression is preferably placed in the reaction chamber 15 between the reaction piston and the third piston 23, in order to urge the piston 23 towards the working chamber 12.

When the non-return valve 22 comprises, in the conventional way, a shut-off member 220, such as a ball, urged elastically against a seat 221, the restriction 17 may quite simply consist of a leakage between the shut-off member 220 and the seat 221.

When the viscosity of the brake fluid is too high to allow this fluid present in the working chamber 12 and in the passage 120 to enter the reaction chamber 15 at the desired rate through the restriction 17, this fluid moves the piston 23 closer to the reaction piston 14, the invention thus alleviating the lack of appearance of the reaction force on the reaction piston 14.

We claim:

1. A master cylinder including a hydraulic reaction comprising:
   a housing having a working chamber therein which is filled with a brake fluid;
   a main piston which slides along a first axis in said working chamber along a first axis, said main piston being pierced with an axial bore;
   a reaction piston connected to said main piston for closing said axial bore to define a reaction chamber, said reaction piston moving along said first axis to delimit within said bore to delimit said reaction chamber, said reaction chamber being connected to said working chamber by way of a non-return valve and a restriction, said non-return valve and restriction imposing upon a flow of fluid from said working chamber toward said reaction chamber and upon a flow of fluid from said reaction chamber toward said working chamber to define a first pressure drop and a second pressure drop, said first pressure drop being higher than said second pressure drop, characterised in that said non-return valve and said restriction are mounted to move independently of said main piston.

2. The master cylinder as recited in claim 1 wherein said non-return valve and restriction are further characterised by being borne by a third piston which slides in a leaktight fashion in said bore between first and second stops.

3. The master cylinder as recited in claim 2 being characterised by a spring loaded in compression located in said reaction chamber between said reaction piston and said third piston.

4. The master cylinder as recited in claim 1 wherein said non-return valve is further characterised by a shut-off member which is elastically urged against a seat, an in that said restriction consist of a leakage path between said shut-off member and said seat.

* * * * *